United States Patent [19]

Brown et al.

[11] 4,290,811

[45] Sep. 22, 1981

[54] METHOD OF PRODUCING SILICATE BINDERS AND COATINGS

[75] Inventors: Kenneth H. Brown; Kenneth M. Wolma, both of Evanston, Ill.

[73] Assignee: Rust-Oleum Corporation, Vernon Hills, Ill.

[21] Appl. No.: 136,152

[22] Filed: Mar. 31, 1980

[51] Int. Cl.$^3$ ................................................ C09D 5/10
[52] U.S. Cl. ................................ 106/1.17; 106/14.21; 106/14.44; 106/287.16; 556/483
[58] Field of Search ............... 106/287.16, 1.17, 14.21, 106/14.44; 556/483

[56] References Cited

U.S. PATENT DOCUMENTS

| | | | |
|---|---|---|---|
| 3,046,242 | 7/1962 | Santelli | 260/29.2 |
| 3,056,684 | 10/1962 | Lopata et al. | 106/14 |
| 3,730,743 | 5/1973 | McLeod | 106/1 |
| 3,821,003 | 6/1974 | Dittrich et al. | 106/1 |
| 3,917,648 | 11/1975 | McLeod | 106/1 |
| 4,154,617 | 5/1979 | Keithler | 106/1.17 |

OTHER PUBLICATIONS

Kunin, *Ion Exchange Resins*, 1972, pp. 255–259.
Union Carbide, *Zinc-Rich Primers*, 1973.
Union Carbide, "Custom Hydrolysis of Ethyl Silicate-40", 1973.
Union Carbide, "Water & Acid in Hydrolyzed Ethyl Silicate Solutions".

*Primary Examiner*—Lorenzo B. Hayes
*Attorney, Agent, or Firm*—Michael T. Murphy

[57] ABSTRACT

An improved method of preparing hydrolyzed alkyl silicate binders useful in manufacturing protective coatings, i.e., zinc-rich coatings, is described wherein the hydrolysis is catalyzed in the presence of a strong acid form ion exchange resin instead of a conventional acid catalyst.

7 Claims, No Drawings

METHOD OF PRODUCING SILICATE BINDERS AND COATINGS

BACKGROUND OF THE INVENTION

U.S. Pat. No. 3,056,684 teaches protective paintlike coatings containing powdered zinc and partially hydrolyzed tetraethyl orthosilicate. The partial hydrolysis of tetraethyl orthosilicate is carried out by dissolving tetraethyl orthosilicate in an organic solvent, adjusting the pH of the solution to a range of 1.5 to 4.0 by the addition of a conventional acid and adding a quantity of water, such quantity being less than an equivalent weight with respect to the quantity of tetraethyl orthosilicate present. Typically, the conventional acids used as catalysts are mineral acids such as hydrochloric acid or sulfuric acid. As a result of using the amount of a conventional acid necessary to effectively catalyze the reaction, there is a residual acidity which may create stability problems with the hydrolyzed ethyl silicate or pot life stability problems after the zinc powder is added.

SUMMARY OF THE INVENTION

The present invention describes a method of preparing stable hydrolyzed alkyl silicate binders useful for producing protective coatings such as zinc-rich coatings. The method utilizes an ion exchange resin as a catalytic source of hydrogen ion instead of conventional acid catalysts. The ion exchange resin is removed after hydrolysis thereby greatly reducing the residual acidity. Lower residual acidity tends to reduce instability of the hydrolyzed alkyl silicate binders and increase the pot life of protective coatings made from the hydrolyzed alkyl silicate.

DETAILED DESCRIPTION OF THE INVENTION

The present invention describes a process of preparing partially hydrolyzed alkyl silicate so that a product of particularly good stability is obtained. The source of the good stability is related to the catalyst used in the preparation.

Generally the process involves dissolving an alkyl silicate in an organic solvent containing a strong acid form ion exchange resin and then slowly adding a quantity of water being in the range of 0.25 to 0.95 of an equivalent weight with respect to the quantity of alkyl silicate, or an amount sufficient to provide 0.125 to 0.475 mole of water for each alkoxy group carried by the alkyl silicate. When a partially hydrolyzed alkyl silicate is used in place of alkyl silicate the quantity of water must be adjusted so as not to exceed the equivalent weight of the unhydrolyzed alkyl silicate.

The alkyl silicates that may be employed in the present invention are alkoxy silicates such as tetraalkoxysilicate where the alkyl groups range from 1 to 4 carbon atoms such as methyl, ethyl, propyl and butyl. The most preferred silicate is tetraethyl orthosilicate.

Partially hydrolyzed alkyl silicates may be used in place of the alkyl silicate when a higher degree of hydrolysis is desired. Commercially available partially hydrolyzed ethyl silicates such as Ethyl Silicate-40 (ES-40) manufactured by the Union Carbide Corporation are particularly preferred.

Organic solvents which may be used are monoalkylene glycol monoalkyl ethers, dialkylene glycol monoalkyl ethers, dialkylene glycol dialkyl ether and monoalkylene glycol dialkyl ether wherein the alkyl groups range from 1 to 6 carbon atoms and the alkylene groups range from 2 to 4 carbon atoms. Cellosolve (trademark of Union Carbide Corporation for ethylene glycol monoethyl ether) is a preferred solvent. Aliphatic ketones and alkanols of from 1 to 6 carbon atoms are additional solvents which may be used. Ethanol and isopropanol are particularly preferred solvents.

Ion exchange resins having strong acid functional groups capable of giving up their labile hydrogen are desired. In addition, the ion exchange resins should be anhydrous and insoluble in organic solvents, therefore readily removable by filtration when the reaction is essentially complete for the desired level of hydrolysis. Amberlyst-15 (trademark of Rohm & Haas Company) has been found to be a particularly preferred ion exchange resin. On the other hand, Dowex 50W-X8 (trademark of Dow Chemical Company), is not a suitable ion exchange resin for this process. Dowex is not anhydrous and has beads which are swelled with water. It is not certain why the swollen beads do not work, but even removal of the water does not make them suitable. In addition to Dowex, Amberlite IR-120 Plus (Rohm & Haas Company) was found to be an unsuitable ion exchange resin for this process and Duolite C3 (Diamond Shamrock Company) did not work when added in an amount containing an equivalent level of hydrogen ions as in an effective amount of Amberlyst-15.

The amount of ion exchange resin added should be sufficient to effectively catalyze the hydrolysis reaction. Since the quantity of available hydrogen ions differ among resins the amount of resin added will vary depending upon the resin which is used. When Amberlyst-15 was used to hydrolyze Ethyl Silicate-40, approximately 1% by weight of the final binder solution was used, or 1.5% the weight of the Ethyl Silicate-40. This resulted in a hydrolysis of approximately 80-95% of the ethyl silicate depending upon the amount of water added.

The following two examples illustrate the improvement over the prior art which is described in this invention. Example 1 describes the method of manufacturing hydrolyzed ethyl silicate using a conventional acid catalyst. Example 2 describes the method of manufacturing hydrolyzed ethyl silicate using an anhydrous strong acid form ion exchange resin as the catalyst. Example 2 should not be considered to limit the scope of this invention, but is provided to illustrate a specific process of this invention which can be compared to the prior art process.

EXAMPLE 1

A reaction vessel is flushed with dry inert gas. To the vessel are added 2300 grams of Ethyl Silicate-40 and 600 grams of anhydrous isopropanol. Agitation is then begun. A solution of 1.79 ml of concentrated hydrochloric acid in 261 ml of water is then added to the vessel over a two hour period, with continuous agitation under the inert gas. The product is stirred for an additional hour and then filtered. The final product was 90% hydrolyzed ethyl silicate.

EXAMPLE 2

A reaction vessel is flushed with dry inert gas. To the vessel are added 2300 grams of Ethyl Silicate-40, 600 grams of anhydrous isopropanol and 36 grams of Amberlyst-15. Agitation is then begun. 261 ml of water is then added over a two hour period, with continuous agitation under the inert gas. The product is stirred for an additional hour and then filtered to remove the Amberlyst-15. The final product was 90% hydrolyzed ethyl silicate.

Hydrolyzed ethyl silicate samples made by the methods of the above Examples were tested for stability. Stability data are presented in the following tables.

TABLE 1

| Acid Catalyst Type | Percent Hydrolysis | Residual Acidity (ppm as HCl) | Shelf Stability Gel Time (sec) | |
|---|---|---|---|---|
| | | | 3 Day Reading | 60 Day Reading |
| 1. HCl | 82.5 | 200 | 115-120 | 75-80 |
| 2. A-15 | 82.5 | 30-60 | 165 | 100 |
| 3. HCl | 90.0 | 200 | 43 | 16 |
| 4. A-15 | 90.0 | 40-50 | 48 | 26 |

HCl is hyrochloric acid. A-15 is Amberlyst-15. Samples 1 and 3 were made according to the prior art method and samples 2 and 4 were made according to the present invention.

PerCent hydrolysis of the ethyl silicate is determined by the amount of water used in the hydrolysis reaction.

Residual acidity was measured by potentiometric titration with standard alcohol solution of base.

Gel time test consists of placing the sample of hydrolyzed ethyl silicate in a viscosity tube, adding a specific amount of morpholine, closing the tube and then turning the tube up, then down so that the air bubble moves up the length of the tube. This is continued until the air bubble essentially stops moving. This time period is called the gel time and is usually expressed in seconds. Morpholine acts as a base for this test, and the further hydrolysis of the ethyl silicate is greatly acclerated in the presence of base.

The data presented in Table 1 illustrates the gel time of each sample when tested after three and 60 days after manufacture. The test is a standard method of testing for gel time, or instability. The following tables illustrate gel time (instability) as determined by the observation of the samples under differing conditions of temperature, time and pot life of the final zinc-rich product.

TABLE 2

| Acid Catalyst Type | Percent Hydrolysis | Residual Acidity (ppm as HCl) | Heat Stability Days till Gelled @ | |
|---|---|---|---|---|
| | | | 120° F. | 140° F. |
| 1. HCl | 82.5 | 200 | >60 | 40-60 |
| 2. A-15 | 82.5 | 30-60 | >60 | 50-60 |
| 3. HCl | 90.0 | 200 | 30 | 21 |
| 4. A-15 | 90.0 | 40-50 | 43-56 | 34 |

A sample of hydrolyzed ethyl silicate was prepared according to the process of Example 2. After straining out the ion exchange resin, half of the product (Sample A) was aged without any additional catalyst, and the other half (Sample B) had concentrated hydrochloric acid added to raise the acid content to near 200 ppm. A third sample (Sample C) was hydrolyzed according to the process of Example 1. The samples were placed on a shelf and their stability was judged by the amount of time necessary to gel the silicate.

TABLE 3

| Sample | Acid Content (ppm as HCl) | Room Temperature Stability (Days) |
|---|---|---|
| A | 26 | 249 |
| B | 172 | 147 |
| C | 188 | 150 |

The final zinc-rich product typically contains various pigments in addition to the zinc dust and the silicate binder. Many different pigments such as metal oxides are commercially available. Pigments are added to provide color and hiding and also some cost reduction. In addition suspending agents such as waxes and clay may be added to provide proper pigment dispersion and rheology. Table 4 provides data on stability (measured by pot life) of pigmented zinc-rich coatings using hydrolyzed ethyl silicate binders.

TABLE 4

| Acid Catalyst Type | Percent Hydrolysis | Residual Acidity (ppm as HCl) | Pot Life After Activation of Fresh PHES with Zinc |
|---|---|---|---|
| 1. HCl | 82.5 | 200 | 9-12 Days |
| 2. A-15 | 82.5 | 30-60 | 25-30 Days |
| 3. HCl | 90.0 | 200 | 6 Days |
| 4. A-15 | 90.0 | 40-50 | 9-10 Days |

PHES is pigmented hydrolyzed ethyl silicate. The pigmented hydrolyzed ethyl silicate is mixed with the proper amount of zinc dust and the time period until gellation is reported in Table 4. The rows numbered 1, 2, 3 and 4 in Tables 1, 2 and 4 represent data from several experiements. Stability data may be averages of several experiments using the same system, or whenever possible, may be expressed as a range.

What is claimed is:

1. A method of making a hydrolyzed alkyl silicate binder which comprises:
   a. dissolving an alkyl silicate, wherein the alkyl groups range from 1 to 4 carbon atoms, in an organic solvent containing sufficient anhydrous strong acid form ion exchange resin to effectively catalyze the hydrolysis reaction; and
   b. adding a quantity of water of an amount sufficient to provide 0.125 to 0.475 moles of water for each alkoxy group carried by the alkyl silicate,
   and c. removing the ion exchange resin after the reaction is completed.

2. A method according to claim 1, of making a hydrolyzed ethyl silicate binder which comprises:
   a. dissolving tetraethyl orthosilicate in an organic solvent containing a sufficient anhydrous strong acid form ion exchange resin to effectively catalyze the hydrolysis reaction; and
   b. adding a quantity of water of an amount sufficient to provide 0.125 to 0.475 mole of water for each ethoxy group carried by the tetraethyl orthosilicate.

3. A method according to claim 1 of making a hydrolyzed ethyl silicate binder which comprises:
   a. dissolving partially hydrolyzed ethyl silicate containing approximately 40% silica in an organic solvent containing a quantity of anhydrous strong acid form ion exchange resin which is at least 1.5% the weight of the partially hydrolyzed ethyl silicate; and
   b. adding a quantity of water sufficient to provide 0.40 to 0.475 mole of water for each ethoxy group carried by the ethyl silicate, thereby attaining 80–95% hydrolysis of the ethyl silicate.

4. A method of making a zinc-rich coating which comprises:
  a. dissolving an alkyl silicate, wherein the alkyl groups range from 1 to 4 carbon atoms, in an organic solvent containing sufficient anhydrous strong acid form ion exchange resin to effectively catalyze the hydrolysis reaction of the alkyl silicate;
  b. adding a quantity of water of an amount sufficient to provide 0.125 to 0.475 moles of water for each alkoxy group carried by the alkyl silicate;
  c. removing the ion exchange resin after the reaction is completed;
  d. adding a quantity of pigments and rheological additives dispersed in anhydrous organic solvent; and
  e. adding a quantity of finely divided zinc dust.

5. A method, according to claim 4, of making a zinc-rich coating which comprises:
  a. dissolving tetraethyl orthosilicate in an organic solvent containing sufficient anhydrous strong acid form ion exchange resin to effectively catalyze the hydrolysis reaction;
  b. adding a quantity of water of an amount sufficient to provide 0.125 to 0.475 mole of water for each ethoxy group carried by the tetraethyl orthosilicate;
  c. removing the ion exchange resin after the reaction is completed;
  d. adding a quantity of pigments and rheological additives dispersed in anhydrous organic solvent; and
  e. adding a quantity of finely divided zinc dust.

6. A method, according to claim 4, of making a zinc-rich coating which comprises:
  a. dissolving partially hydrolyzed ethyl silicate containing approximately 40% silica in an organic solvent containing a quantity of anhydrous strong acid form ion exchange resin which is at least 1.5% the weight of the partially hydrolyzed ethyl silicate;
  b. adding a quantity of water sufficient to provide 0.40 to 0.475 mole of water for each ethoxy group carried by the ethyl silicate, thereby attaining 80–95% hydrolysis of the ethyl silicate.
  c. removing the ion exchange resin after the reaction is completed;
  d. adding a quantity of pigments and rheological additives dispersed in anhydrous organic solvent; and
  e. adding a quantity of finely divided zinc dust.

7. In a method of making zinc-rich coatings which comprises dissolving tetraethyl orthosilicate in an organic solvent, adding a quantity of an acidic catalyst to the solution whereby to adjust the pH to the range of 1.5 to 4.0, adding a quantity of water to the solution, such quantity being in the range of 0.25 to 0.95 of an equivalent weight with respect to the quantity of tetraethyl orthosilicate to produce a liquid siloxane having an average chain length of 5 to 10 silicon atoms, agitating the mixture until an exothermic reaction is initiated, continuing agitation until the exothermic reaction is completed and the temperature of the solution begins to subside, and adding finely divided zinc dust to the resulting fluid; the improvement comprising as said catalyst, an anhydrous strong acid-form ion exchange resin capable of giving up its labile hydrogen ions, followed by the removal of the ion exchange resin after the exothermic reaction is complete and before the zinc dust is added.

* * * * *